United States Patent [19]
Evdokimov et al.

[11] 4,158,128
[45] Jun. 12, 1979

[54] ROLLER FOR APPLYING UNIFORM LOAD ACROSS THE WIDTH OF PROCESSED SHEET MATERIAL

[75] Inventors: Valery N. Evdokimov; July R. Zeldin; Vladimir A. Kuznetsov, all of Ivanovo, U.S.S.R.

[73] Assignee: Ivanovsky Nauchno-Issledo-Valetelsky Experimentalnokonstruktorsky Mashinostroitelny Institut, U.S.S.R.

[21] Appl. No.: 808,390

[22] Filed: Jun. 20, 1977

[51] Int. Cl.² .................. B21B 27/10; H05B 3/02
[52] U.S. Cl. .................. 219/469; 29/113 AD; 29/110; 38/44; 165/50; 219/244; 219/530
[58] Field of Search ............ 219/216, 244, 389, 469, 219/470, 471, 530; 29/113 AD, 116 AD, 110, 130; 165/48, 50; 38/44, 52

[56] References Cited
U.S. PATENT DOCUMENTS

| | | | |
|---|---|---|---|
| 242,058 | 5/1881 | Schürmann | 29/116 AD |
| 2,700,094 | 1/1955 | Hosack | 219/469 X |
| 2,739,218 | 3/1956 | Wennerlund | 219/469 |
| 3,050,829 | 8/1962 | Appenzeller | 29/113 AD |
| 3,105,133 | 9/1963 | Norton | 219/469 |
| 3,328,866 | 7/1967 | Robertson | 29/116 AD |
| 3,757,398 | 9/1973 | Urban | 29/116 AD |
| 3,840,958 | 10/1974 | Mahn | 29/110 |
| 3,852,860 | 12/1974 | Tewes | 29/110 |

FOREIGN PATENT DOCUMENTS

| | | | |
|---|---|---|---|
| 43978 | 12/1971 | Japan | 29/113 AD |
| 1208539 | 10/1970 | United Kingdom | 29/116 AD |

*Primary Examiner*—Volodymyr Y. Mayewsky
*Attorney, Agent, or Firm*—Steinberg & Blake

[57] ABSTRACT

The roller comprises a core and a shell secured to said core. The shell is made up of two coaxial pipes, i.e. an inner pipe secured to the core in the middle and an outer pipe fastened to the inner pipe in the middle and at the ends. This allows the shell to be made of small-diameter thin-walled pipes thus reducing the roller deflection and decreasing considerably the weight both of the roller proper and of the equipment utilizing said roller.

12 Claims, 7 Drawing Figures

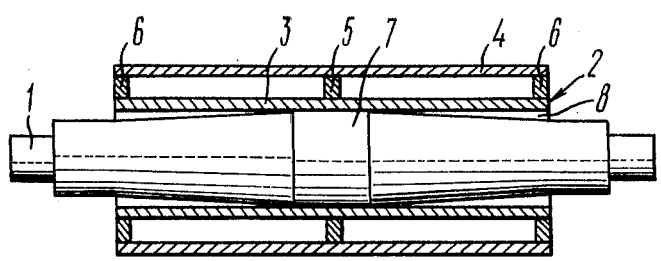
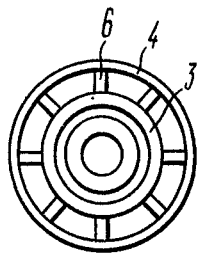
FIG.1  FIG.2
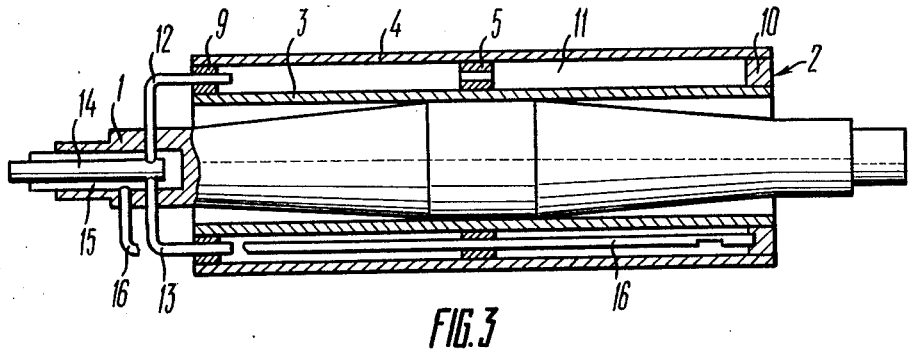
FIG.3

ROLLER FOR APPLYING UNIFORM LOAD ACROSS THE WIDTH OF PROCESSED SHEET MATERIAL

The present invention relates to the equipment for processing of sheet materials and more specifically it relates to rollers for applying uniform load across the width of a sheet material (e.g. fabric) in the course of its processing wherein the sheet material is processed between two rollers pressed against each other. This roller can be used with great effect in textile industry e.g. in finishing calenders, squeezing and sizing machines, padders and in the technological equipment of paper-making and metallurgical industries, in the equipment for rolling plastic and rubber sheet materials, i.e. actually in all the cases calling for uniform distribution of load across the width of a sheet material.

Uniform load is applied across the width of a sheet material (fabric) during processing by two types of rollers. The first type includes "floating" rollers whose deflection during loading is controlled by a layer of liquid contained under pressure in the roller space facing the matching roller and formed by the face and axial seals. Such rollers are complicated in design, call for a high manufacturing accuracy, employment of pumping plants and have to be frequently paired because of quick-wearing seals.

The other type includes rollers which comprise coaxially arranged core and shell, the latter being secured on said core (see, for example, Author's Certificate No. 152233, Cl.DO6 C 15/08, USSR). However, in this design of the roller it becomes impossible to achieve zero deflection of the shell ends relative to the middle of the shell due to discrepancy between the rated and actual stiffness of the roller cross section so that the deflection of the shell is considerably stronger than the rated value. Therefore, to compensate for the difference between the actual and rated stiffness of the roller cross section, the stiffness of core and shell has to be considerably increased.

Naturally, this increases the geometrical dimensions and mass of the rollers and, consequently, of the machines where said rollers are used. The same disadvantages characterize the roller wherein the core diameter decreases from the middle towards the ends.

The reduction of the core diameter towards its ends is nothing else but crowning whose magnitude is determined by deflection of the core under a single load. Inasmuch as the roller of this design has to ensure contact along the straight line of the distorted core and the inner wall of the shell, this leads to another disadvantage which is inherent in all crowned rollers, i.e. a noticeable irregularity of load distribution and, therefore, nonuniform technological effect across the width of the processed material by deviation of actual load from a calculated one.

An object of the present invention lies in eliminating the aforesaid disadvantages.

The main object of the invention lies in providing a roller for applying uniform load across the width of a processed sheet material wherein deflection of the shell in operation would be minimized thus ensuring a substantially straight-line contact between said shell and the material being processed.

In accordance with this and other objects, the roller for applying a uniform load across the width of a processed sheet material comprising a core and a shell secured to said core which, according to the invention, has a shell formed by two coaxial pipes, i.e. an inner pipe secured to the core in the middle, and an outer pipe secured to the inner pipe in the middle and at the ends.

This design of the shell ensures an insignificant deflection of the roller and, as a consequence, uniform distribution of load on the material being processed. Such a shell can be made of small-diameter thin-walled pipes which, in turn, contributes to a reduction in the mass of, say, squeezing machines and paves the way to devising reliable machinery which does not call for sophisticated servicing.

The invention is also characterized in that the ends of the pipes are interconnected by a hermetic joint and form a closed circular space between the pipes which allows said space to accommodate various devices for controlling the temperature of the shell surface. This widens the possibilities for using the roller in such machines as textile calenders, super-calenders for paper sheets, calenders for processing technical rubber products and polymer films.

It is practicable that the roller should have pipelines communicating with the circular space of the shell for filling said space with a heating or cooling fluid medium, or electric heaters installed in said closed circular space along the shell axis.

It is practicable that said electric heaters should be enclosed in tubes which allows the circular space to be filled with a liquid heat carrier or with a medium which is melted by the heat produced by said heaters. This contributes to uniform distribution of temperature along the roller and extends the life of the heaters when it is required to maintain a high temperature on the shell surface by increasing the coefficient of heat-transfer from electric heaters to the outer pipe of the roller.

It is also desirable that the surface of the outer pipe of the shell should be coated by an elastic material which is particularly important for such machines as textile calenders and super-calenders for processing paper sheets.

Thus, the roller according to the invention can be made of small-diameter thin-walled pipes which raises their manufacturing accuracy, reduces considerably the size and mass of wringing machines, padders and all types of calenders, and diminishes their cost. Such a roller does not call for special servicing in operation while the possibility of controlling the temperature of its surface widens the scope of its employment.

Now the invention will be described in detail by way of examples of a roller for applying uniform load across the width of a sheet material during processing, with reference to the accompanying drawings (in which):

FIG. 1 is a partial longitudinal section of the roller according to the invention, an elementary diagram;

FIG. 2—same as in FIG. 1, end view;

FIG. 3 is a longitudinal section of the roller according to the invention, with pipelines;

Figure 4:
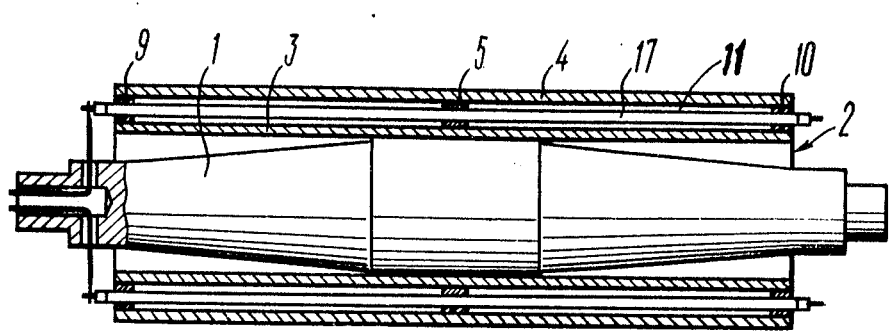
FIG. 4 is a longitudinal section of the roller according to the invention, with electric heaters.
Figure 5:
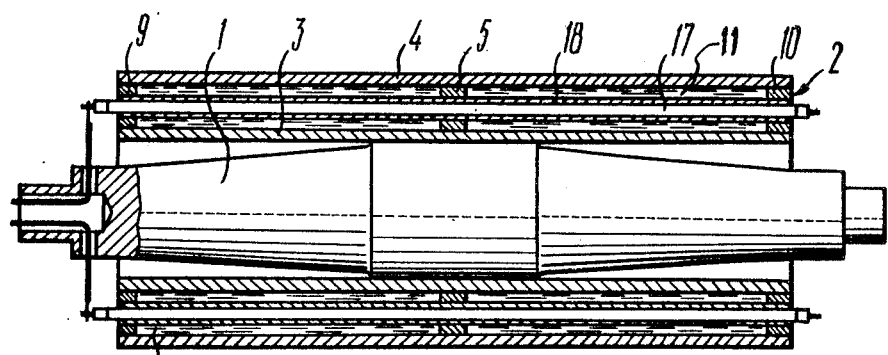
FIG. 5 is a longitudinal section of the roller according to the invention, with electric heaters enclosed in tubes.

The roller for applying uniform load across the width of a processed sheet material, e.g. fabric, comprises a core 1 (FIGS. 1-6) and a shell 2 secured to said core.

The shell 2 is made up of two coaxial pipes 3 and 4, i.e. an inner pipe 3 secured to the core 1 in the middle by any conventional method and an outer pipe 4 secured to the inner pipe 3 in the middle and at the ends.

According to one version of pipe fastening (shown in FIG. 1) the pipes 3 and 4 are interconnected by a ring 5 in the middle and by ribs 6 at the ends (FIG. 2).

The diameter of the core decreases from the middle 7 towards the ends, so that there is a clearance 8 between In another version of pipe fastening shown in FIG. 3 the ends of the pipes 3 and 4 are interconnected hermetically by rings 9 and 10 thus forming a closed circular space 11 between the pipes 3 and 4. Said space 11 communicates through pipelines 12 and 13 passing through a ring 9 and connected to a branch pipe 14, with the main line (not shown in the drawing) for delivering a cooling or heating fluid into the roller space 11.

The branch pipe 14 is located in a space 15 located in the core 1 and is intended to discharge the used heating or cooling fluid. The space 15 communicates with the circular space 11 through a pipe 16.

The problem of selecting either a cooling fluid, e.g. water or a heating fluid, e.g. steam, depends on the application of the roller; for more uniform distribution of temperatures over the surface of the shell it is practicable that the used fluid should be discharged at a point located near the ring 10.

The closed circular space 11 of the roller shown in FIG. 4 accommodates electric heaters 17 (FIG. 4) arranged along the shell axis. Said heater can be installed in the tubes 18 (FIG. 5) secured in the rings 9 and 10. The space 11 is filled with a liquid heat carrier or with a medium 19 which melts during operation of the electric heaters 17. Such a melting medium can be constituted by any known organosilicon compounds or any other compounds suitable for the fulfillment of the object.

Figure 6:
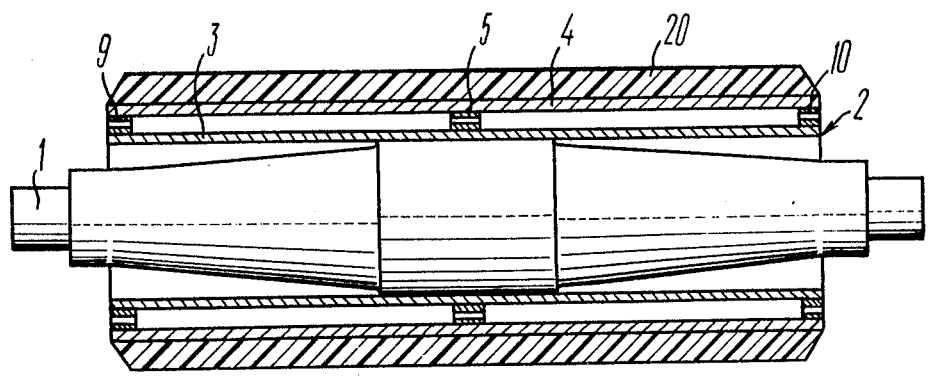
FIG. 6 is a partial longitudinal section of the roller according to the invention, provided with an elastic coating.

The outer pipe 4 of the roller illustrated in FIG. 6 is provided with a coating 20 made of an elastic material, e.g. a polyamide material or compressed fibrous mass.

The rollers according to the invention function as follows.

The roller according to the invention (FIGS. 1 through 6) works in conjunction with another roller 21 (FIG. 7) in a two-roller machine or in contact with an intermediate roller in multiple-roller installations, the deflections of the roller 21 or of the intermediate roller being negligible. One or both matching rollers may be power-driven.

Figure 7:
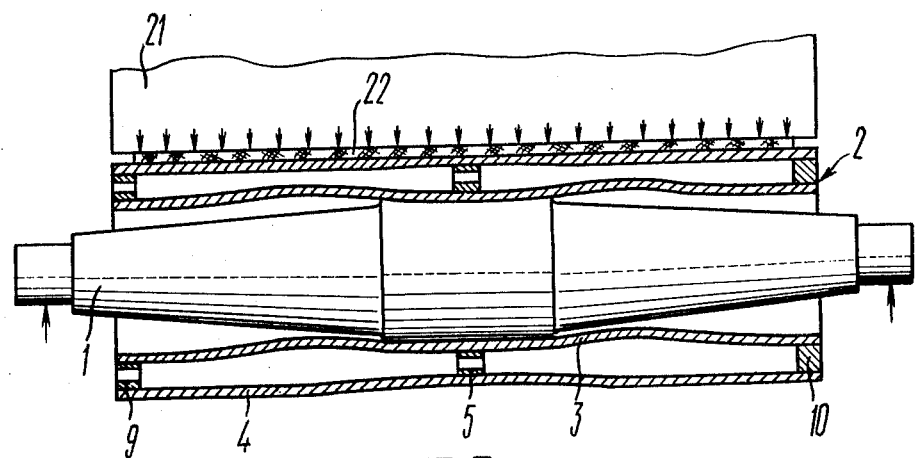
FIG. 7 is a schematic partial longitudinal section of the roller according to the invention.

The roller may take any position in space relative to the roller 21 or to the intermediate roller; for example, it may be mounted under the roller 21 as shown in FIG. 7. The load is applied, as a rule, to the ends of the core 1 as shown in FIG. 7. In this case the sheet material 22, e.g. fabric, is loaded both from the side of the roller considered here and from the roller 21.

Under the weight of the load the roller core 1 sags down relative to the supports. Simultaneously, the middle portion of the pipe 3 deflects with its convex part down and, under the effect of the load conveyed by rings 5, 9 and 10, the ends of the pipe 3 also deflect down.

By proper selection of the degrees of stiffness of the core 1 and pipe 4 this deflection relative to the roller supports will be equal to the deflection of its middle section so that the rings 5,9 and 10 will be located on one and the same straight line.

In view of the fact that the rings 5,9 and 10 rigidly connect the pipes 3 and 4, e.g. by welding, the pipe 3 proves to be a roller resting on three supports. As a result, the deflection of the outer pipe 4 and shell 2 is considerably smaller than that of the inner pipe 3. Thus, when a load of 50 kg per 1 cm is applied to a working width of 1400 mm, the deflection of a roller of 215 mm diameter will be about 0.005 mm. This is lower than the permissible manufacturing tolerance on the outside diameter of the roller.

What is claimed is:

1. A roller for applying a uniform load across the width of a processed sheet material comprising:
    an elongate core; and
    an elongate shell assembly defining a hollow interior space, said core being disposed within said interior space, said shell assembly comprising an inner pipe fastened at its mid-portion to the mid-portion of said core and an outer pipe coaxially extending over said inner pipe and fastened to the inner pipe at the mid and end portions thereof, said outer pipe being substantially non-bendable under the load supplied by the roll to the processed sheet material.

2. A roller according to claim 1 wherein the outer pipe is formed of a heat-conductive material and the ends of the pipes are hermetically interconnected, forming a closed circular space between the pipes.

3. A roller according to claim 2 further including electric heaters installed within said circular space, said heaters extending along the shell axis.

4. A roller according to claim 3 wherein the electric heaters are enclosed in tubes.

5. A roller according to claim 4 wherein the closed circular space is filled with a liquid heat carrier.

6. A roller according to claim 4 wherein the closed circular space is filled with a medium adapted to melt during operation of said electric heaters.

7. A roller according to claim 2 further including pipeline means communicating with the circular space for delivering a temperature changing fluid into said space.

8. A roller according to claim 7 wherein said temperature changing fluid is a cooling fluid.

9. A roller according to claim 7 wherein said temperature changing fluid is a heating fluid.

10. A roller according to claim 1 wherein said core comprises an elongate member having a circular transverse cross-section, said member tapering inwardly in the direction of its terminal ends within said shell defining a clearance between said core and said inner pipe, said clearance increasing in the direction of the terminal ends of said member.

11. A roller according to claim 10 wherein said elongate member is further defined by a central cylindrical section at its mid-portion.

12. A roller according to claim 1 wherein said inner pipe is fastened to said outer pipe at its mid-portion by an annular ring and at each of its end portions by a plurality of ribs.

* * * * *